United States Patent [19]

Nagano

[11] 4,306,871
[45] Dec. 22, 1981

[54] REAR DERAILLEUR AND CONTROL WIRE GUIDE

[75] Inventor: Masashi Nagano, Sakai, Japan

[73] Assignee: Shimano Industrial Company, Limited, Osaka, Japan

[21] Appl. No.: 101,443

[22] Filed: Dec. 10, 1979

[30] Foreign Application Priority Data

Dec. 30, 1978 [JP] Japan ............................ 53-166091
Dec. 30, 1978 [JP] Japan ......................... 53-183721[U]
Feb. 5, 1979 [JP] Japan ........................... 54-14342[U]
Feb. 5, 1979 [JP] Japan ........................... 54-14343[U]

[51] Int. Cl.³ .......................................... F16H 11/04
[52] U.S. Cl. .................................. 474/82; 74/501 R
[58] Field of Search ................... 474/82, 81, 80, 79, 474/78; 74/501

[56] References Cited

U.S. PATENT DOCUMENTS 3,974,707 8/1976 Nagano ............................... 474/82
4,226,132 10/1980 Nagano et al. ...................... 474/82

Primary Examiner—C. J. Husar
Assistant Examiner—Conrad Berman
Attorney, Agent, or Firm—Stevens, Davis, Miller & Mosher

[57] ABSTRACT

A speed-changing device for a bicycle, having a pantograph mechanism which comprises four members, a supporting member, two linkage members, and movable member, is pivoted through a horizontal spindle swingably to a bracket fixed to a fork end of the bicycle. A wire holder for securing one end of a control wire is provided at one of the two linkage members and movable member, and a wire guide for guiding the control wire is disposed at a position outward with respect to the common axis of a multi-stage sprocket and beyond a phantom straight line connecting the axes of the wire holder and horizontal spindle.

11 Claims, 13 Drawing Figures

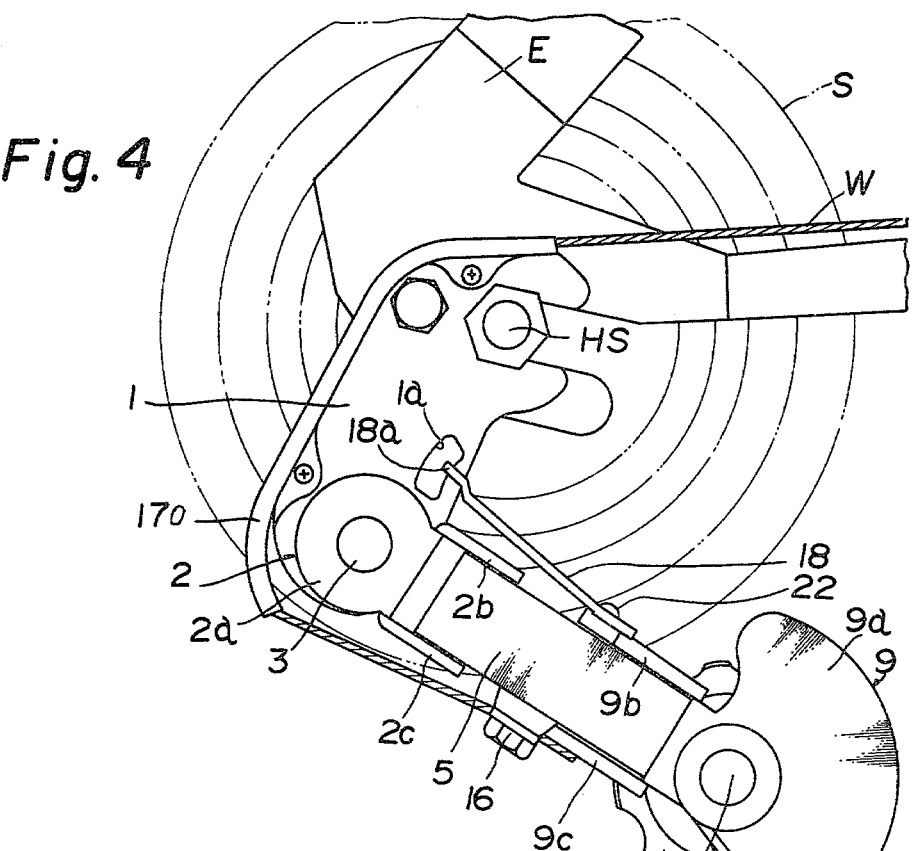
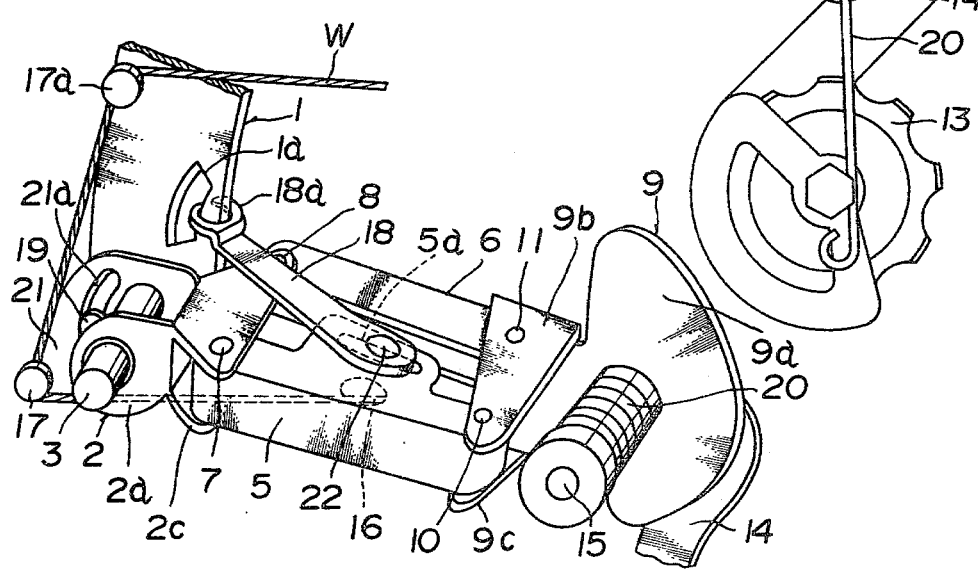

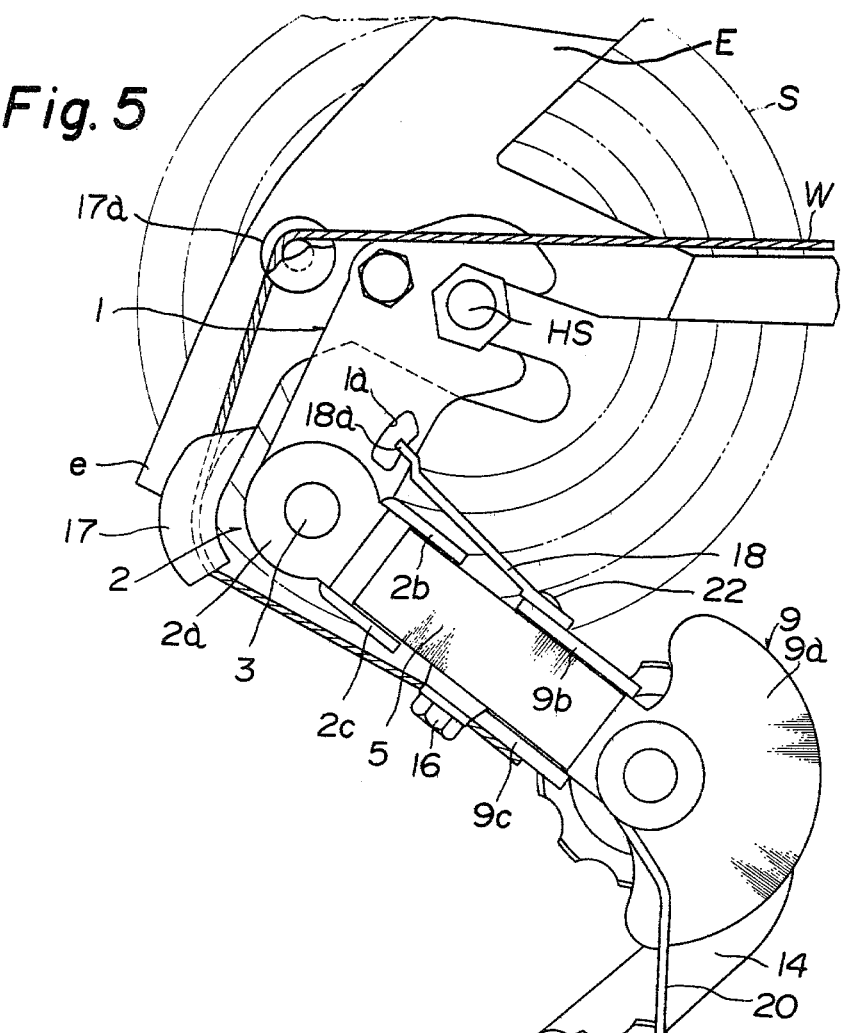
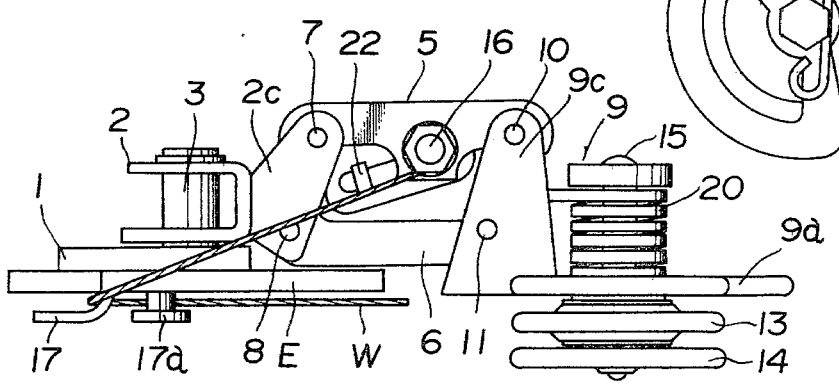

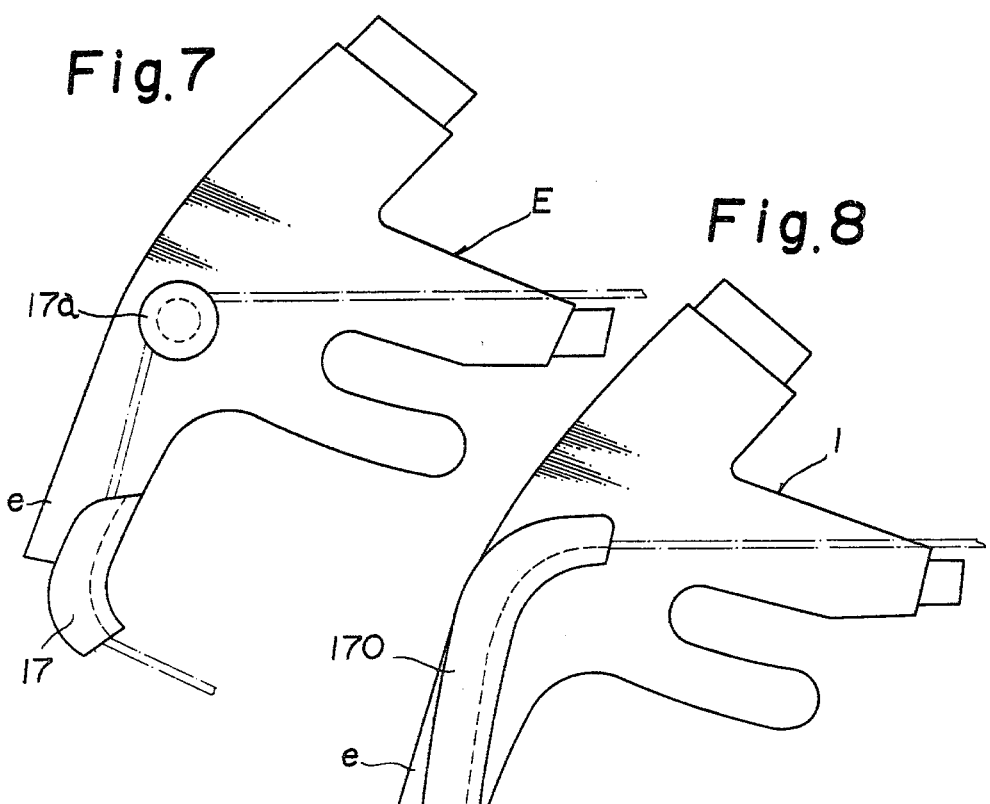
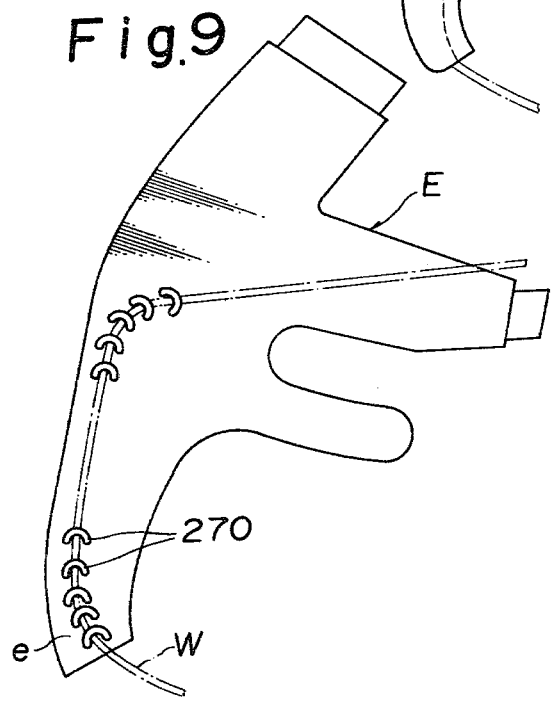

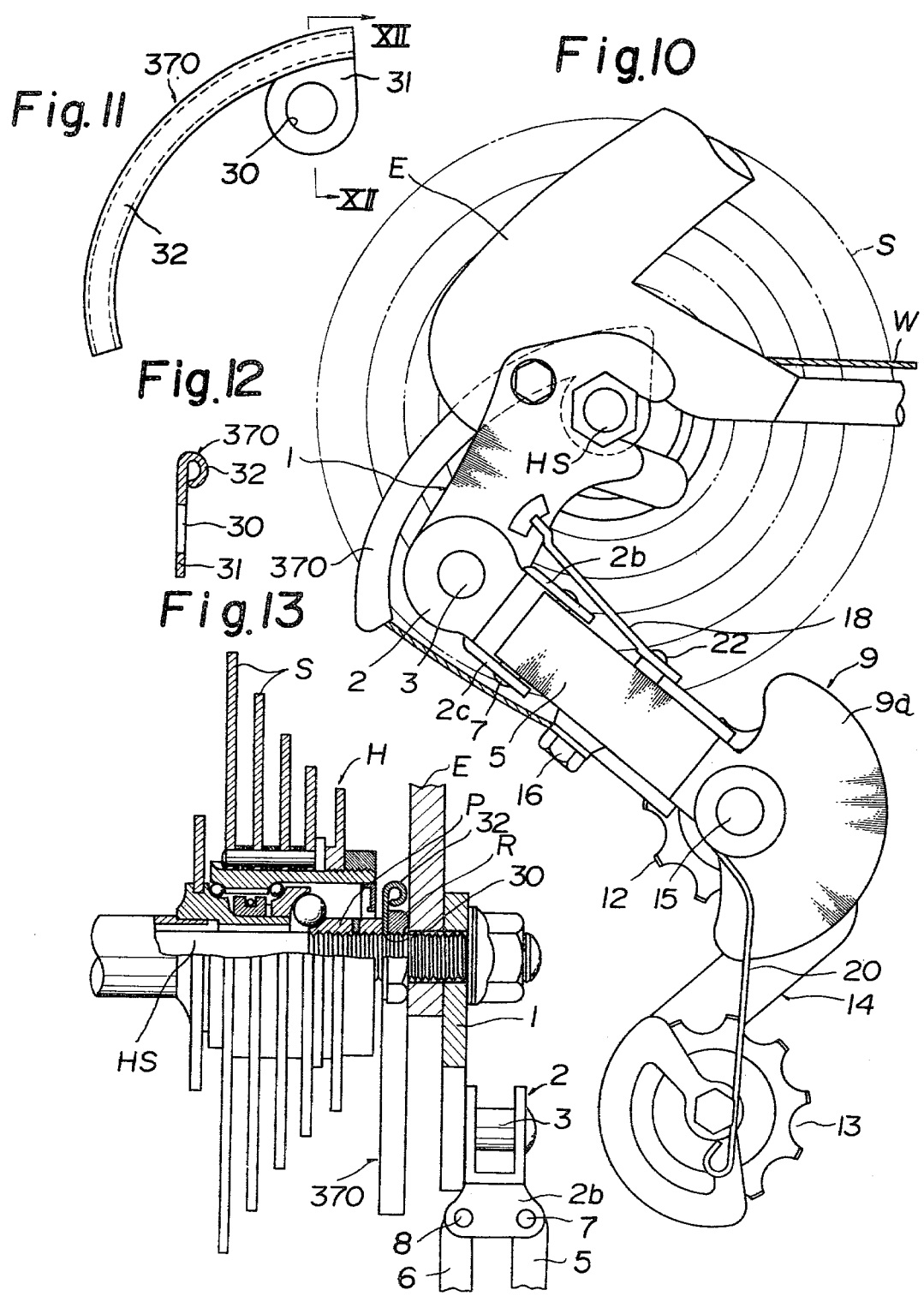

REAR DERAILLEUR AND CONTROL WIRE GUIDE

BACKGROUND AND SUMMARY OF THE INVENTION

This invention relates to a speed-changing device for a bicycle, and more particularly to a speed-changing device comprising a rear derailleur and a control wire therefor which is operated to actuate the derailleur to switch a driving chain to a selective one of a plurality of sprockets.

Generally, the rear derailleur comprises a pantograph mechanism comprising a supporting member supported to a bracket, two linkage members, and movable member, these four members being pivotally connected through four parallel spindles. A chain change-over cage having two pulleys is pivoted to the movable member through one horizontal spindle.

A control cable (Bowden cable) for operating the derailleur comprises an inner wire and an outer sheath guiding the wire, the inner wire being fixed at its one end to one member, for example, one linkage member, among the four members at the pantograph mechanism and the outer sheath being fixed at its one end to another member, for example, the supporting member, movable relative to the wire fixing member. The wire is operated to transform the pantograph mechanism and shift the movable member axially of the multi-stage sprockets at a hub of the bicycle to thereby switch a driving chain to a selective one of the sprockets through the pulleys.

In the above construction, the control wire, which is guided by the outer sheath follows a desired route connecting, the derailleur and a control lever therefor without being under tension. The outer sheath, when used, considerably projects laterally of a wheel of the bicycle and may catch a cyclists' foot or the like. Also, the outer sheath causes poor transfer efficiency of the lever control for the derailleur, and expands or contracts in length more than the control wire causing a change in the relative effective length therefore and an improper speed-changing operation.

Two members in relative movement at the pantograph mechanism hold the control wire and outer sheath at respective one ends thereof, whereby the wire is operated to transform the pantograph mechanism and move the movable member with respect to the supporting member only axially of the multi-stage sprockets. Consequently, the wire, when pulled for changing the speed, allows the pulleys carried by the movable member to shift only axially of the sprocket, making them difficult to control. Furthermore, when the chain is stationary, i.e., no pedalling, the derailleur is subjected to even greater resistance to its movement, whereby the speed-changing is impossible.

The latter problem is solvable by use of a saver mechanism provided at the pantograph mechanism, the saver mechanism comprising an energy conserving plate separate from the four pantograph members and an energy conserving spring acting on the plate, the plate holding the wire or outer sheath, so that when resistance over a predetermined value is applied against the speed-changing, the wire is controlled to shift only the energy conserving plate against the spring, whereby the chain, when the resistance is eliminated, is automatically switched to the desired speedchange stage. However, the saver mechanism results in a high cost of manufacture and an increase in weight.

This invention has been designed to overcome the above problem of the conventional derailleur. An object of the invention is to provide a speed-changing device capable of controlling a derailleur by use of a control wire only without an outer sheath to thereby eliminate the defects caused by the outer sheath and improve the speed change efficiency. The wire also is controllable even when resistance greater than the predetermined value is applied against the speed-changing, and the chain, when the resistance decreases, can be switched to a desired speed-change stage defined by operating the wire. Furthermore, there is no fear that a cyclist may catch his foot or the like by the conventional outer sheath projecting sidewise of the bicycle wheel.

The speed-changing device of the invention is provided with a wire guide uniquely positioned with respect to the derailleur so that a control wire without an outer sheath is guided through the wire guide to thereby control the pantograph mechanism of the derailleur. The wire is operated to shift the pulleys at the change-over cage carried by the movable member, axially and simultaneously radially of the sprockets.

In greater detail, the pantograph mecanism comprising a supporting member, two linkage members and movable member, is pivoted through a first horizontal spindle swingably to a bracket fixed to a fork end of the bicycle. A wire holder is provided at one of the two linkage members and movable member to thereby hold one end of the control wire. A wire guide for guiding the wire to the wire holder is disposed at a position outward with respect to the common axis of the sprockets and beyond a phantom straight line connecting the axes of the wire holder and first horizontal spindle.

When the wire is operated to transform the pantograph mechanism to thereby shift the pulleys axially of the sprockets, the pantograph mechanism simultaneously swings with respect to the bracket around the first horizontal spindle to thereby shift the pulleys also radially of the sprockets.

Accordingly, the speed-changing device of the invention is capable of only changing the speed by use of the control wire without requiring an outer sheath thereby improving the transfer efficiency of the lever control for the derailleur. Furthermore, due to the absence of an outer sheath, there is no fear that expansion or contraction of its length will change the relative length to the control wire to thereby cause a poor speed-changing operation.

Furthermore, the speed-changing device of the invention, when the wire is pulled for changing the speed, not only transforms the pantograph mechanism but also swings it with respect to the bracket to thereby shift two pulleys radially as well as axially of the sprockets. Hence, the driving chain guided by the pulleys is smoothly switched to a desired sprocket from the oblique direction thereof resulting in shifting with a light control of the wire. In addition, even when the chain is stationary during the absence of pedalling and resistance more than the predetermined value is applied against axial movement of the pulleys, the control wire is operable to swing the pantograph mechanism through the supporting member, so that energy from the wire control can be conserved and the chain, when the resistance is released, can be switched to a sprocket at a desired speed-change stage. As a result, one saver mechanism, such as the conventional energy conserving spring or plate, is not necessary, whereby the speed-changing device of the invention is inexpensive while still attaining the above described advantages. Furthermore, absence of the outer sheath eliminates the possibility of a cyclist catching his foot or the by the projecting outer sheath.

Alternatively, the wire guide may be mounted to the supporting member or bracket of the derailleur, the fork end of the bicycle to which the bracket is fixed, or a hub shaft fixed to the fork end supporting the sprockets.

These and other objects and novel features of the invention will be more apparent from the description of an embodiment of the invention in accordance with the drawings.

BRIEF DESCRIPTION OF THE DRAWINGS

FIG. 3 is a perspective view of the principal portion of the speed-changing device in FIG. 1, FIGS. 4 and 5 are front views of modified embodiments of the invention, FIG. 6 is a bottom view of the embodiment in FIG. 5, FIG. 7 is a front view of a fork end only, which is used in the embodiment in FIG. 5, FIGS. 8 and 9 are front views of fork ends of other modified embodiments, corresponding to FIG. 7, FIG. 10 is a front view of a further modified embodiment of a speed-changing device of the invention, FIG. 11 is a front view of a wire guide only, which is used in the further modified embodiment in FIG. 10, FIG. 12 is a sectional view taken on the line XII—XII in FIG. 11, and FIG. 13 is a partially cutaway side view of a wire guide mounting portion at the embodiment in FIG. 10, looking from the right side.

DETAILED DESCRIPTION OF THE INVENTION

Figure 1:
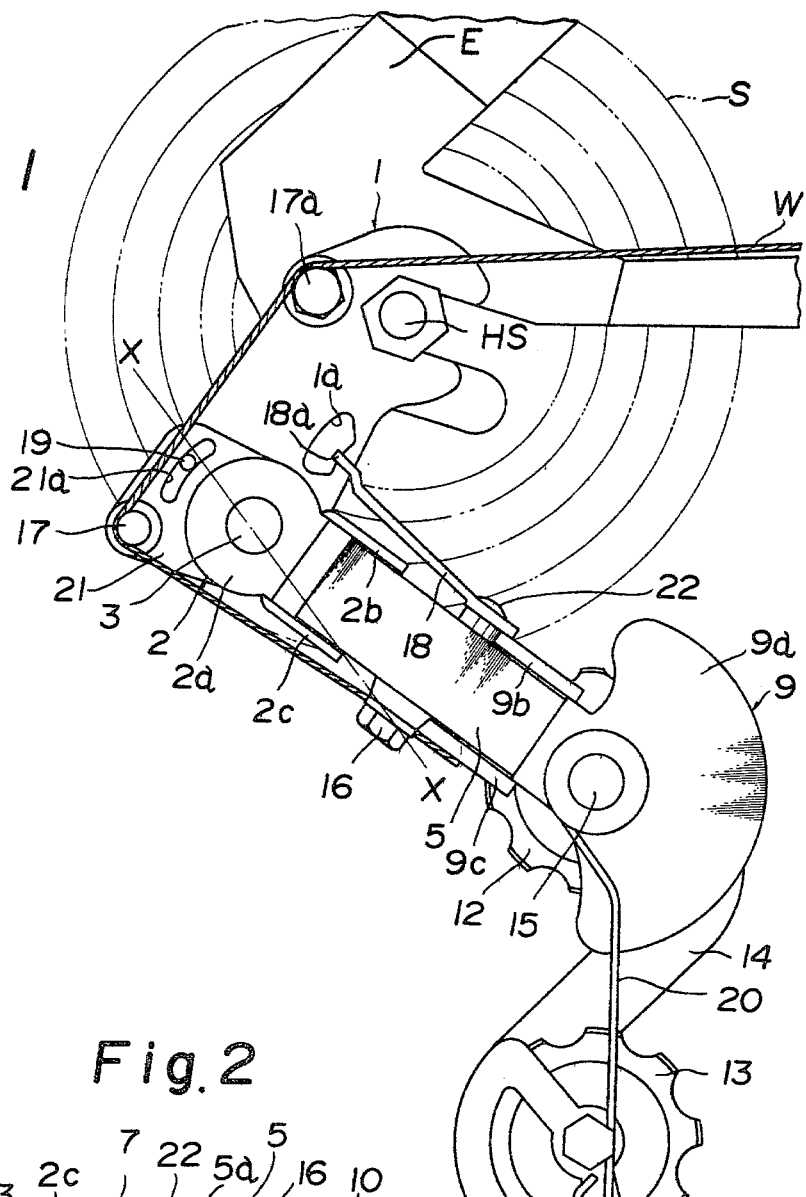
FIG. 1 is a front view of an embodiment of a speed-changing device of the invention.

Referring to the drawings, reference numeral 1 designates a bracket which has an utmost end of a pawl-like shape, the utmost end together with a hub shaft HS being fixed to a fork end E at the bicycle frame.

Reference numeral 2 designates a supporting member mounted swingably to the lower portion of the bracket 1 through a first horizontal spindle 3. The supporting member 2 comprises a main body 2a of a metallic plate bent in a U-like shape and two supports 2b and 2c extending from the main body 2a, and is supported to the bracket 1 in relation of being swingable in a given range through the horizontal spindle 3 projecting through the center of the body 2a.

Reference numerals 5 and 6 designate linkage members pivoted to the supports 2b and 2c at the supporting member 2 through two spindles 7 and 8 perpendicular with respect to the horizontal spindle 3. Reference numeral 9 designates a movable member pivoted to the foremost ends of linkage members 5 and 6 through two spindles 10 and 11 parallel to the spindles 7 and 8 respectively. The movable member 9 comprises a plate-like shaped body 9a and two supports 9b and 9c. The supports 9b and 9c sandwich therebetween the foremost ends of linkage members 5 and 6 and pivotally support them. The body 9a carries a chain changeover cage 14 pivoted thereto through a second horizontal spindle 15 parallel to the horizontal spindle 3, the change-over cage 14 having a guide pulley 12 and a tension pulley 13.

The supporting member 2, two linkage members 5 and 6, and movable member 9, constitute a pantograph mechanism, and the pantograph mechanism and bracket 1 constitute a bicycle derailleur.

The derailleur causes the pulleys 12 and 13 together with the movable member 9 to shift through the spindles 7, 8, 10 and 11 axially of the multi-stage sprockets S mounted to a hub of the bicycle and also shift radially of the sprockets S around the first horizontal spindle 3.

A speed-changing device of the invention includes; a wire holder 16 at one of the two linkage members and movable member among the four members constituting the pantograph mechanism at the derailleur. The wire holder 16 fixes one end of a control wire. The invention also includes a wire guide 17 for guiding the control wire W toward the wire holder 16, the wire guide 17 being positioned outwardly with respect to the common axis of the sprockets S and beyond a phantom straight line X—X (shown in the dot-and-dash line in FIG. 1) connecting the axes of the wire holder 16 and first horizontal spindle 3. The wire, which is guided through the wire guide 17 and fixed to the wire holder 16, is operated to transform the pantograph mechanism to thereby shift the pulleys 12 and 13 axially of the sprockets S, and simultaneously allow the pantograph mechanism to swing around the first horizontal spindle 3 which pivotally supports the supporting member 2 to the bracket 1, thereby shifting the pulleys 12 and 13 also radially of the sprockets S.

In other words, the wire W is pulled to transform and simultaneously swing the pantograph mechanism to thereby force the pulleys 12 and 13 to shift axially of the sprockets S and also radially thereof around the spindle 3.

Figure 2:
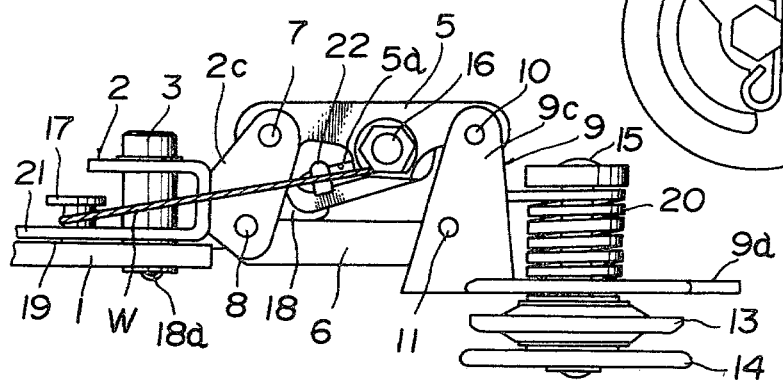
FIG. 2 is a bottom view thereof.

Referring to FIGS. 1 and 2, the wire holder 16 is provided at one linkage member 5, a first wire guide 17 is provided at an extension 21 of the supporting member 2, and a second wire guide 17a, at the bracket 1.

The derailleur shown in FIGS. 1 and 2 is provided with no return spring. A brace 18 is supported to the one linkage member 5 through a slot 5a and a pin 22 as shown in FIGS. 1 and 3. A hook 18a is formed at the utmost end of the brace 18 and insertably engaged with a bore 1a at the bracket 1. A tension spring 20 is wound around the second horizontal spindle 15 supporting therethrough the change-over cage 14 and is retained at one end to the movable member 9 and at the other end, to the change-over cage 14. The tension spring 20 serves to bias the pantograph mechanism in the direction that the movable member 9 approaches the fore end of bracket 1, in other words, the axis of sprocket S.

An arcuate slot 21a is formed at the extension 21 and a pin 19 is provided at the bracket 1, the pin 19 being fit into the slot 21a, whereby the supporting member 2 swings with respect to the bracket 1 in a restricted range defined by the length of the slot 21a.

In this construction, the wire W is fixed at one end thereof to the wire holder 16, extends through the wire guides 17 and 17a, and is fixed at the other end to a control lever attached to a handle bar or frame in the vicinity thereof at the bicycle. Thus, the wire W is tensioned between the lever and the wire holder 16, and a conventional outer sheath is not used.

When the lever is operated to pull the wire W, a distance between the wire holder 16 and the first wire guide 17 is reduced to transform the pantograph mechanism, whereby the movable member 9 and pulleys 12 and 13 are displaced axially of the sprockets S. At this time, a distance between the first wire guide 17 and the second wire guide 17a is also reduced to allow the supporting member 2 to swing clockwise with respect to the bracket 1 around the first horizontal spindle 3. Hence, the pantograph mechanism including the supporting member 2 swings around the first horizontal spindle 3 to thereby force the pulleys 12 and 13 to shift also radially outwardly of the sprockets S.

In the just described speed-changing operation, the pulleys 12 and 13 move radially as well as axially with respect to the sprockets S, in other words, the pulleys move along a resultant of corresponding to the axial and radial movements or in an oblique direction with respect to the sprockets S, and the chain guided by the pulleys 12 and 13 is switched smoothly and with easy to a selective one of the sprockets S, whereby a small force is sufficient to pull the wire W. If the chain is stationary due to the absence of pedalling, greater resistance is applied to the pulleys 12 and 13 against axial movement thereof. Hence, when the control wire is pulled, the movable member 9 is restrained from moving axially of the sprockets, but is permitted to swing around the first horizontal spindle 3 at the supporting member 2, so that the pantograph mechanism swings clockwise around the spindle 3. As a result, the spring 20 deflects to conserve the energy of controlling the wire W, and the conserved energy, when the resistance disappears, allows the pantograph mechanism to transform.

A conventional return spring can be mounted to the pantograph mechanism between the supporting member 2 and bracket 1, and, the brace 18 removed. The spring biases the pantograph mechanism toward the bracket 1 in the direction of allowing the pulleys 12 and 13 to approach the common axis of sprockets S.

The embodiment shown in FIGS. 1 through 3 has two wire guides 17,17a mounted to the supporting member 2 and bracket 1. Alternatively, both the first and second wire guides 17 and 17a may be provided at the bracket 1. Or, one wire guide 170 instead of the two may be mounted to the bracket 1 as shown in FIG. 4.

The wire guide 170 comprises a main body and an extension, the main body being arranged outwardly with respect to the axis of sprocket S and beyond the earlier described phantom line X—X, the extension extending from the main body to near the fixing portion of the bracket 1 to the fork end E.

Alternatively, the wire guides 17 and 17a or 170 may be mounted to the fork end E as shown in FIG. 5, or, to the hub shaft HS as shown in FIG. 10. In the former case, the wire guides are provided at an extension e of the fork end E. The two wire guides 17 and 17a shown in FIGS. 1 through 3 may be replaced by those of the embodiment shown in FIGS. 5 and 7. Or, the one wire guide 170 shown in FIG. 4 may be mounted to the fork end E as shown in FIG. 8.

Also, a plurality of wire guides 270, as shown in FIG. 9, may be mounted to the fork end E along the guiding path for the wire W.

When mounted to the hub shaft HS as shown in FIG. 10, the wire guide 370 comprises a mounting portion 31 having a threaded bore 30 insertable onto the hub shaft HS and a guide portion 32, so that the bore 30 is screwed with the hub shaft HS and tightened by a lock nut R which secures a bearing member P at a hub H of the bicycle.

As many apparently widely different embodiments of the invention may be made without departing from the spirit and scope thereof, it is to be understood that the invention is not limited to the specific embodiments described but only by the appended claims.

What is claimed is:

1. A speed-changing device for a bicycle for switching a driving chain to one of a plurality of axially aligned sprockets comprising;

a control wire;

a rear derailleur controlled by said control wire, said derailleur comprising a bracket fixed to a fork end of the bicycle and a pantograph mechanism pivoted swingably to said bracket through a horizontal first spindle, said pantograph mechanism comprising a supporting member pivoted to said bracket through said horizontal first spindle, two linkage members pivoted to said supporting member through second and third spindles perpendicular with respect to said horizontal first spindle, and a movable member pivoted to said two linkage members through fourth and fifth spindles perpendicular with respect to said horizontal first spindle, said movable member pivotally carrying through a horizontal sixth spindle parallel to said horizontal first spindle a chain change-over cage having two pulleys;

a wire holder for fixing therewith one end of said wire, said wire holder being provided at one of said two linkage members and said movable member at said pantograph mechanism; and at least one wire guiding said wire, said wire guide being disposed at a position outward with respect to the axis of said sprockets and beyond a phantom straight line connecting the axes of said wire holder and horizontal first spindle such that when said wire, which is guided by said wire guide and fixed to said wire holder, is operated to transform said pantograph mechanism to thereby shift said pulleys axially of said sprocket, said pantograph mechanism swings with respect to said bracket around said horizontal first spindle to also shift said pulleys radially of said sprocket.

2. A speed-changing device for a bicycle according to claim 1, wherein said wire guide is provided at said derailleur.

3. A speed-changing device for a bicycle according to claim 2, wherein said wire guide is provided at said supporting member.

4. A speed-changing device for a bicycle according to claim 2, wherein said wire guide is provided at said bracket.

5. A speed-changing device for a bicycle according to claim 1, wherin said wire guide is provided at said fork end of the bicycle, said fork end fixing said bracket.

6. A speed-changing device for a bicycle according to claim 1, wherein said wire guide is mounted to a hub shaft supporting said sprockets which is fixed to said fork end.

7. A speed-changing device for a bicycle according to claim 6, wherein said wire guide comprises, a mounting portion having a through bore insertable onto said hub shaft, and a guide portion.

8. A speed-changing device for a bicycle according to claim 2, wherein said wire guide, which is disposed at the position outward with respect to the axis of said sprocket and beyond said phantom straight line, has an extension extending to the vicinity of a portion of said bracket which is fixed to said fork end.

9. A speed-changing device for a bicycle according to claim 2, wherein a pair of first and second wire guides are provided, said first wire guide being disposed at the position outward with respect to the axis of said sprockets and beyond the phantom straight line connecting the axes of said wire holder and horizontal first spindle, said second wire guide being disposed in the vicinity of a portion of said bracket which is fixed to said fork end of the bicycle.

10. A speed-changing device for a bicycle according to claim 9, wherein said first wire guide is provided at said supporting member and said second wire guide is provided at said bracket.

11. A speed-changing device for a bicycle according to claim 9, wherein said first and second wire guides are provided at said bracket.

* * * * *